(12) United States Patent
Allemand (10) Patent No.: US 8,925,212 B2
(45) Date of Patent: Jan. 6, 2015

(54) LIGHTED LEVEL TOOL

(75) Inventor: James S. Allemand, Mokena, IL (US)

(73) Assignee: Swanson Tool Company, Inc., Frankfort, IL (US)

( * ) Notice: Subject to any disclaimer, the term of this patent is extended or adjusted under 35 U.S.C. 154(b) by 777 days.

(21) Appl. No.: 13/099,159

(22) Filed: May 2, 2011

(65) Prior Publication Data

US 2011/0265339 A1 Nov. 3, 2011

Related U.S. Application Data

(60) Provisional application No. 61/330,572, filed on May 3, 2010.

(51) Int. Cl.
*G01C 9/32* (2006.01)

(52) U.S. Cl.
CPC ........................................ *G01C 9/32* (2013.01)
USPC ........................................... 33/348.2; 33/451

(58) Field of Classification Search
CPC ........................................................ G01C 9/32
USPC ........ 33/348, 348.2, 365, 377, 379, 381, 451, 33/366.23; 362/84, 101, 318, 119
See application file for complete search history.

(56) References Cited

U.S. PATENT DOCUMENTS

| | | | |
|---|---|---|---|
| 2,615,122 A * | 10/1952 | Coombs ........................ | 33/348.2 |
| 2,944,144 A * | 7/1960 | Naylor .......................... | 33/348.2 |
| 4,407,075 A | 10/1983 | MacDermott et al. | |
| 4,506,450 A | 3/1985 | Flemish et al. | |
| 4,625,423 A | 12/1986 | Sackett | |
| 4,833,788 A | 5/1989 | Munro | |
| 4,876,798 A | 10/1989 | Zimmerman | |
| 4,912,854 A | 4/1990 | Weadon | |
| 5,020,232 A | 6/1991 | Whiteford | |
| 5,025,567 A | 6/1991 | McWilliams | |
| 5,031,329 A | 7/1991 | Smallidge | |
| 5,075,978 A | 12/1991 | Crowe | |
| 5,180,221 A | 1/1993 | Yoder | |
| 5,199,177 A | 4/1993 | Hutchins et al. | |
| 5,412,876 A | 5/1995 | Scheyer | |

(Continued)

FOREIGN PATENT DOCUMENTS

EP 344934 A1 12/1989
GB 2224839 A 5/1990

(Continued)

OTHER PUBLICATIONS

Spectra LL600 Laser Level, Trimble, 2002.

(Continued)

*Primary Examiner* — R. A. Smith
*Assistant Examiner* — Tania Courson
(74) *Attorney, Agent, or Firm* — Brinks Gilson & Lione (57) ABSTRACT

A lighted level tool comprising a body including at least one vial opening, a vial disposed at least partially within the at least one vial opening, a light source for illuminating the vial, an insert member mounted at a predetermined location in the body relative to the at least one vial opening, and at least one an end cap mounted at an end of the body. The insert member is configured to receive the vial therein and to hold the light source opposite an end of the vial. A control circuit for powering the light source is mounted in the at least one end cap.

8 Claims, 11 Drawing Sheets

(56) References Cited

U.S. PATENT DOCUMENTS

| | | | |
|---|---|---|---|
| 5,561,911 A | 10/1996 | Martin | |
| 6,037,874 A | 3/2000 | Heironimus | |
| 6,606,798 B2 | 8/2003 | El-Katcha et al. | |
| 6,675,490 B1 | 1/2004 | Krehel et al. | |
| 6,748,665 B1 * | 6/2004 | Samp | 33/348.2 |
| 6,748,666 B2 * | 6/2004 | Zugel et al. | 33/451 |
| 6,851,200 B2 | 2/2005 | Tan | |
| 6,915,583 B2 | 7/2005 | El-Katcha et al. | |
| 7,013,571 B2 | 3/2006 | El-Katcha et al. | |
| 7,024,781 B1 | 4/2006 | Cowie | |
| 7,073,270 B2 * | 7/2006 | Kim | 33/451 |
| 7,117,608 B2 | 10/2006 | Zugel et al. | |
| 7,900,366 B2 * | 3/2011 | Spaulding | 33/348.2 |
| 8,359,757 B1 * | 1/2013 | Ruys | 33/348.2 |
| 2003/0005592 A1 * | 1/2003 | Wang | 33/451 |
| 2005/0229414 A1 | 10/2005 | Kim | |
| 2007/0074411 A1 | 4/2007 | Mo | |
| 2007/0076188 A1 | 4/2007 | Katayama et al. | |
| 2007/0130785 A1 | 6/2007 | Bublitz et al. | |
| 2009/0235544 A1 | 9/2009 | Spaulding | |

FOREIGN PATENT DOCUMENTS

| | | |
|---|---|---|
| GB | 2361317 A | 10/2001 |
| GB | 2371863 A | 8/2002 |
| GB | 2399635 A | 9/2004 |
| JP | 2004163381 A | 6/2004 |
| WO | WO9318370 A1 | 9/1993 |
| WO | WO2004020944 A1 | 3/2004 |
| WO | WO2007072489 A2 | 6/2007 |
| WO | WO2007072489 A3 | 6/2007 |
| WO | WO2007128992 A1 | 11/2007 |

OTHER PUBLICATIONS

Horizon Laser System Operators Manual, Apache Technologies, 2006, pp. 1-11.

AccuLine 40 6640, Johnson Level and Tool, 2007.

PCT International Search Report/Written Opinion of the International Searching Authority (the European Patent Office) regarding Application No. PCT/US2011/034827, dated Aug. 2, 2011, 10 pages.

* cited by examiner

Fig. 25 ial Application Ser. No. 61/330,572, filed May 3, 2010, which is
LIGHTED LEVEL TOOL

RELATED APPLICATIONS

The present patent document claims the benefit of the filing date under 35 U.S.C. §119(e) of Provisional U.S. Patent Application Ser. No. 61/330,572, filed May 3, 2010, which is hereby incorporated by reference.

BACKGROUND

The invention relates generally to a lighted level tool for indicating the orientation of a structure or surface.

As is known in the art, level tools are used to indicate the orientation of a particular structure or surface with respect to a reference axis, such as a horizontal reference axis that is generally parallel to the horizon, a vertical reference axis that is perpendicular to the horizontal axis and is generally aligned with the direction of the force of gravity, or a reference axis having another orientation.

A typical level tool generally includes an elongated body that defines a pair of opposing, generally parallel working surfaces and one or more vial openings with bubble vials secured therein. The vials may be aligned in different directions relative to the working surfaces for indicating the orientation of a structure. For example, a plumb vial may be aligned in a direction perpendicular to the working surfaces, and a level vial may be aligned in a direction parallel to the working surfaces. As a result, when one of the working surfaces engages a generally vertical structure, an air bubble is generally centered within the plumb vial. Similarly, when one of the working surfaces engages a generally horizontal structure, an air bubble is generally centered within the level vial. However, certain work conditions, especially low light conditions, may decrease the visibility of the vials.

It is desirable to provide a level tool with a suitable strength and durability and an easy to read to vial.

BRIEF SUMMARY

In one aspect of the present invention, there is provided a lighted level tool comprising a body including at least one vial opening, a vial disposed at least partially within the at least one vial opening, a light source for illuminating the vial, and an insert member mounted at a predetermined location in the body relative to the at least one vial opening. The insert member is configured to receive the vial therein and to hold the light source opposite an end of the vial.

In another aspect of the present invention, there is provided a lighted level tool comprising a body including at least one vial opening, a vial disposed at least partially within the at least one vial opening, a light source for illuminating the vial disposed opposite an end of the vial, at least one end cap mounted at an end of the body, and a control circuit for powering the light source at least partially housed in the at least one end cap.

Further objects, features, and advantages of the present invention will become apparent from consideration of the following description and the appended claims when taken in connection with the accompanying drawings.

DETAILED DESCRIPTION

Referring now to the present invention, FIGS. 1-20 show a lighted level tool having one or more illuminated vials in accordance with the principles of the present invention.

Figure 1:
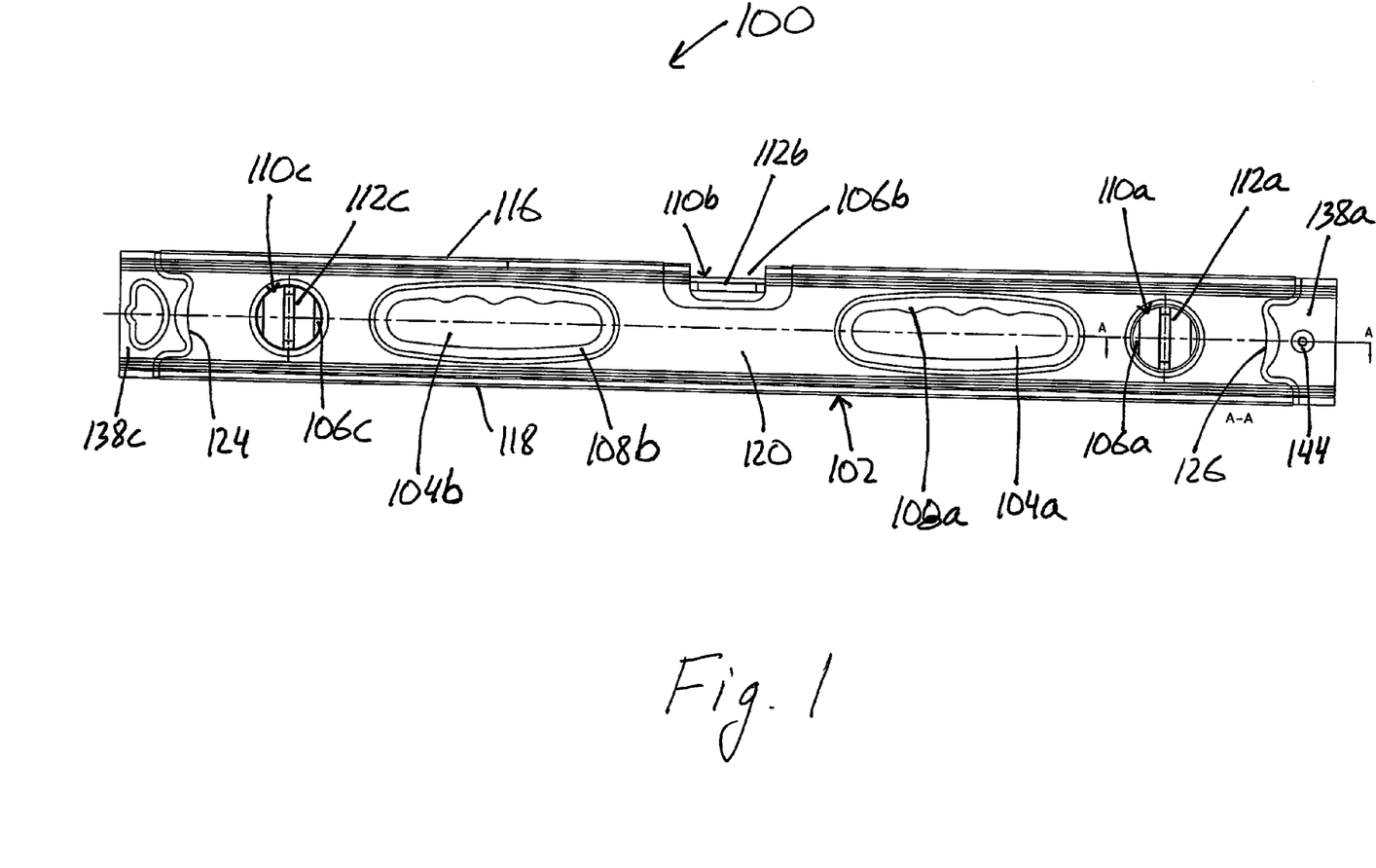
FIG. 1 is a side view of a first embodiment of a level embodying the principles of the present invention.
Figure 2:
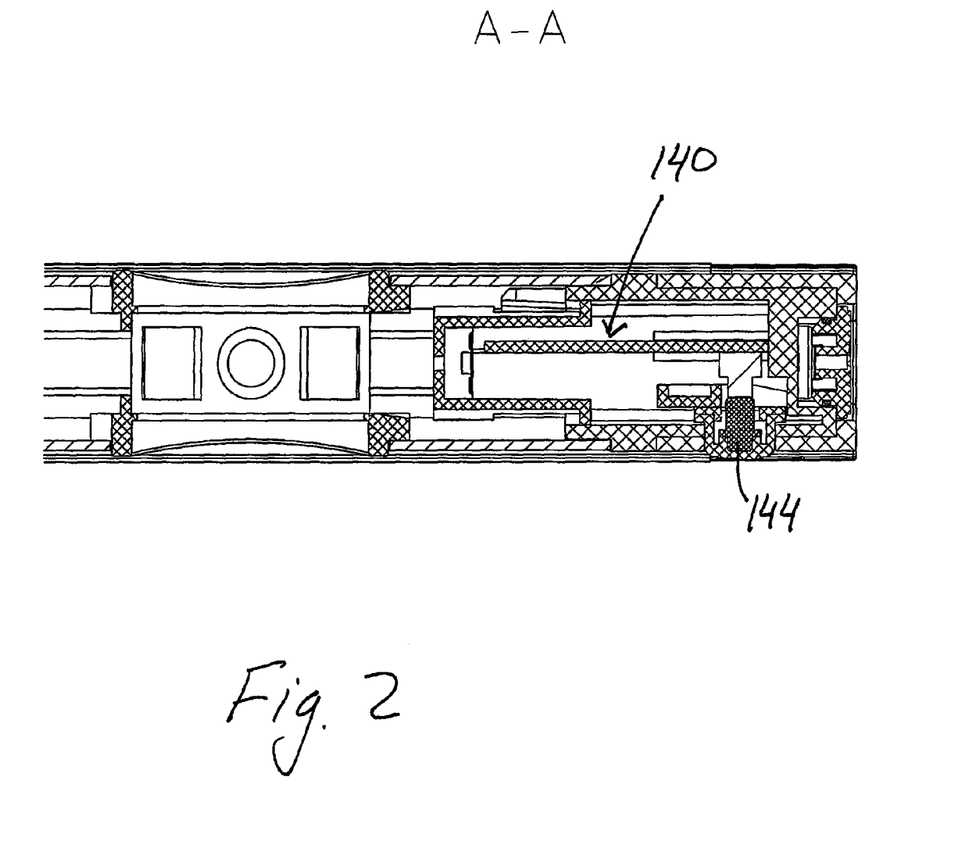
FIG. 2 is a partial cross-sectional view taken along line A-A of the level shown in FIG. 1.
Figure 3:
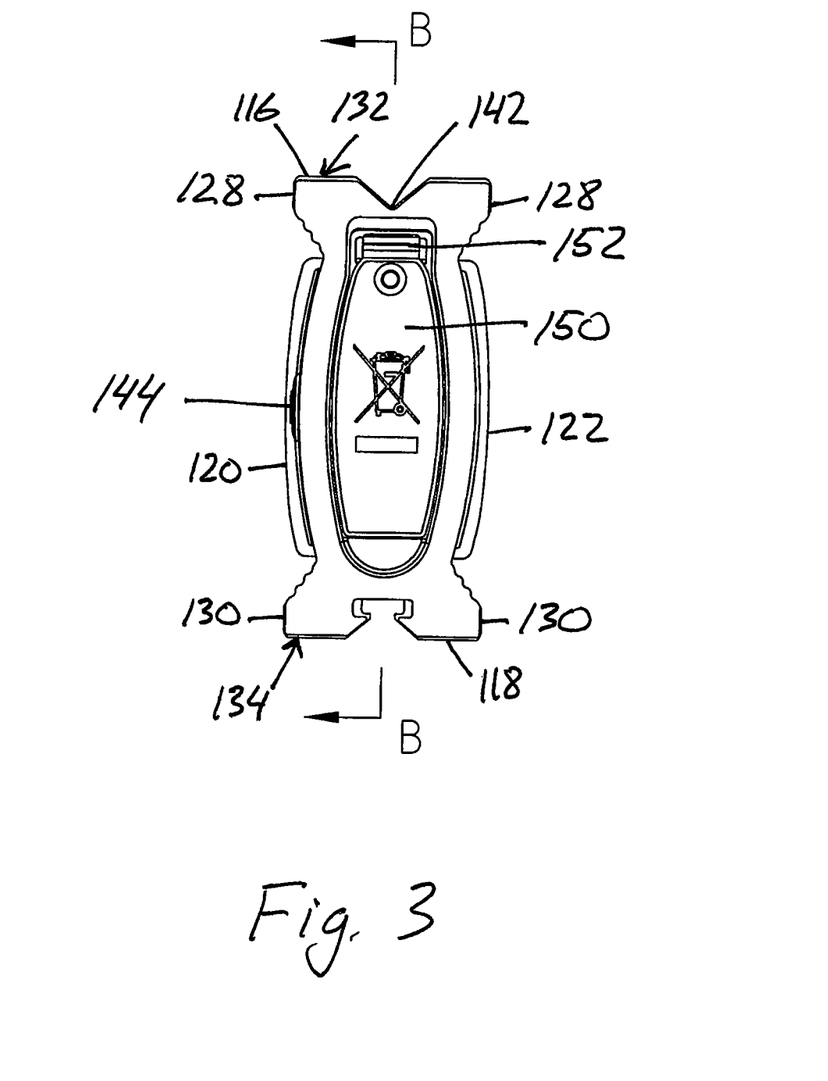
FIG. 3 is a front view of the level shown in FIG. 1.

FIGS. 1 and 3 shows a level tool embodiment 100 that includes an elongated body 102 having a generally hollow cross-sectional shape. The body 102 defines at least one hand opening and at least one vial opening. In the present embodiment, a pair of spaced-apart hand openings 104a, 104b and three spaced-apart vial openings 106a, 106b, 106c are formed in the body 102 along the longitudinal length of the body 102. The vial openings 106a, 106b, 106c include a rectangular central vial opening 106b disposed between pair of circular end vial openings 106a, 106c. Each hand opening and each vial opening extends completely through the body 102 in a direction transverse to the longitudinal axis of the body 102.

The level tool 100 further includes a pair of hand grips 108a, 108b secured in the hand openings 104a, 104b for gripping the level tool 100, a pair of shock absorbing end caps 138a, 138b mounted at opposing ends of the body 102, and three vial assemblies 110a, 110b, 110c arranged at least partially within the vial openings 106a, 106b, 106c for indicating the orientation of a structure with respect to a reference axis, such as a horizontal axis, a vertical axis, or another axis.

In particular, the body 102 includes a pair of top and bottom walls 116, 118 extending between opposing ends 124, 126 of the body 102 and a pair of generally parallel, oppositely facing side walls 120, 122 connected between the top and bottom walls 116, 118. The top wall 116 includes a V-shaped groove 142 that extends along its longitudinal length to facilitate placement on a pipe or a conduit. The bottom wall includes a channel groove that extends along its longitudinal length to facilitate placement on square corners of a structure. The body 102 is made of metal, such as aluminum, or a metal alloy, but any other suitable durable material may be used, such as a plastic or a composite material. Also, the body 102 may be formed by an extrusion process or any other suitable process.

Figure 4:
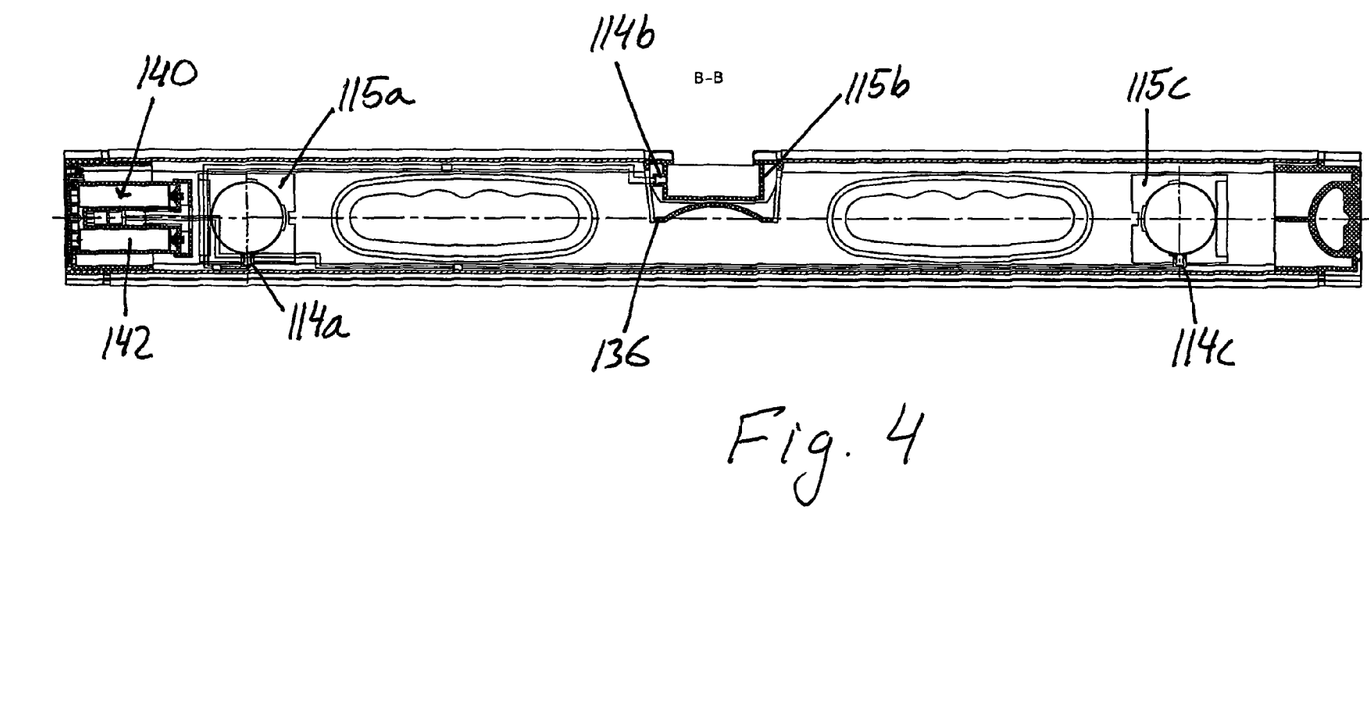
FIG. 4 is a cross-sectional view taken along line B-B of the level shown in FIG. 3.
Figure 4A:
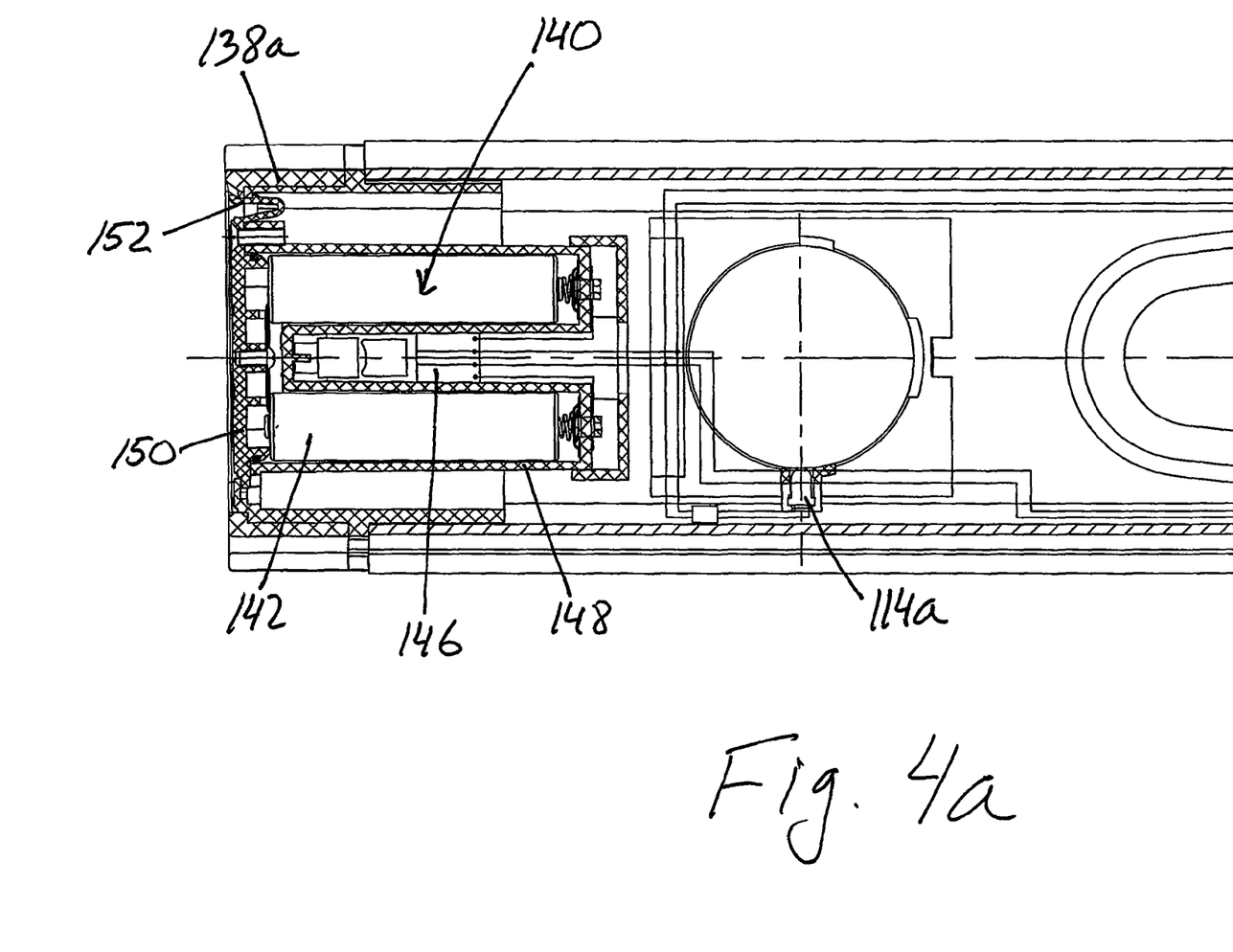
FIG. 4a is partial view of the level shown in FIG. 4.
Figure 5:
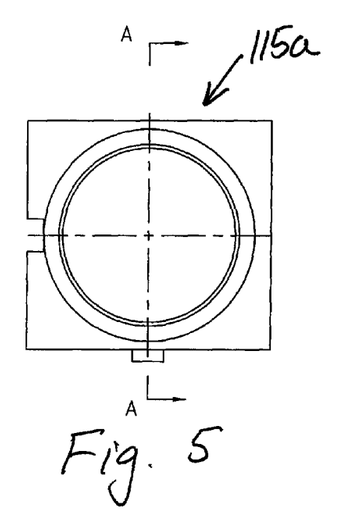
FIG. 5 is a left side view of an insert member of an end vial assembly of the level shown in FIG. 1.
Figure 6:
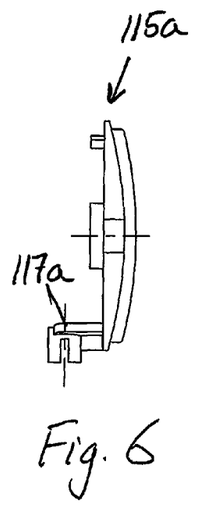
FIG. 6 is a front view of the insert member shown in FIG. 5.
Figure 7:
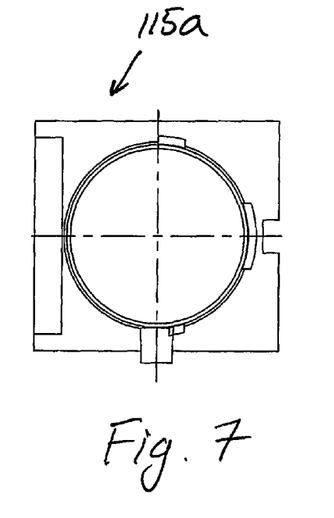
FIG. 7 is a right side front view of the insert member shown in FIG. 5.
Figure 8:
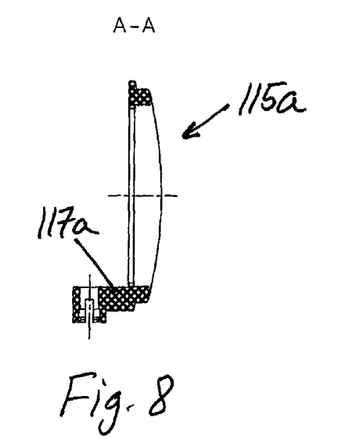
FIG. 8 is a cross-sectional view taken along line A-A of the insert member shown in FIG. 5.
Figure 9:
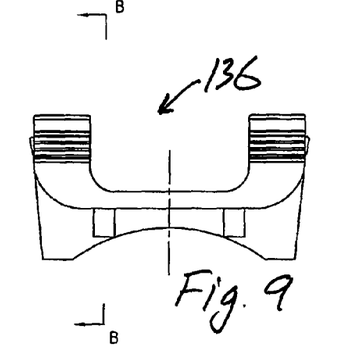
FIG. 9 is a left side view of a bracket for mounting a center vial assembly of the level shown in FIG. 1.
Figure 10:
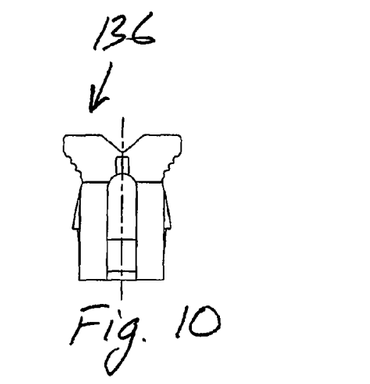
FIG. 10 is a front view of the bracket shown in FIG. 9.
Figure 11:
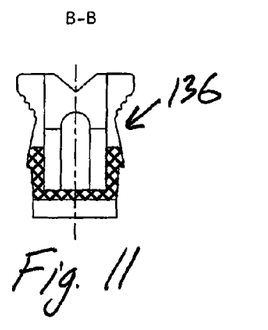
FIG. 11 is a cross-sectional view taken along line B-B of the bracket shown in FIG. 9.
Figure 12:
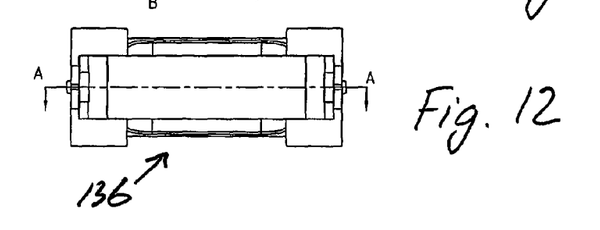
FIG. 12 is a top view of the bracket shown in FIG. 9.
Figure 13:
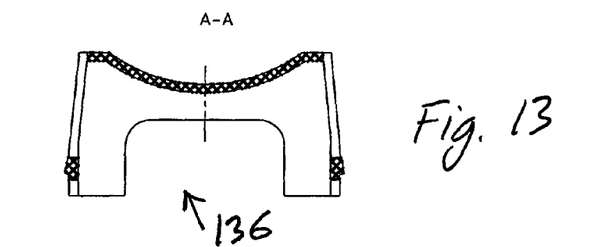
FIG. 13 is a cross-sectional view taken along line A-A of the bracket shown in FIG. 12.
Figure 14:
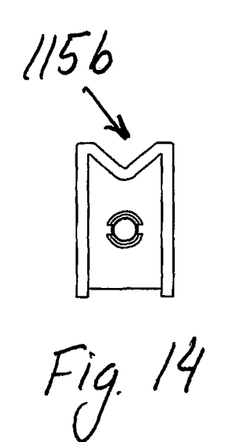
FIG. 14 is a front view an insert member of a center vial assembly of the level shown in FIG. 1.
Figure 15:
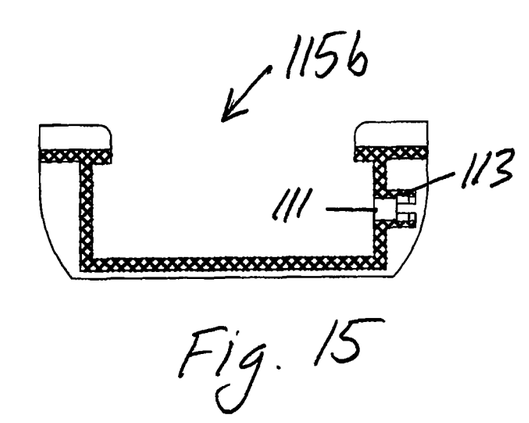
FIG. 15 is a cross-sectional view of the insert member shown in FIG. 14.
Figures 16, 17, 18, 19:
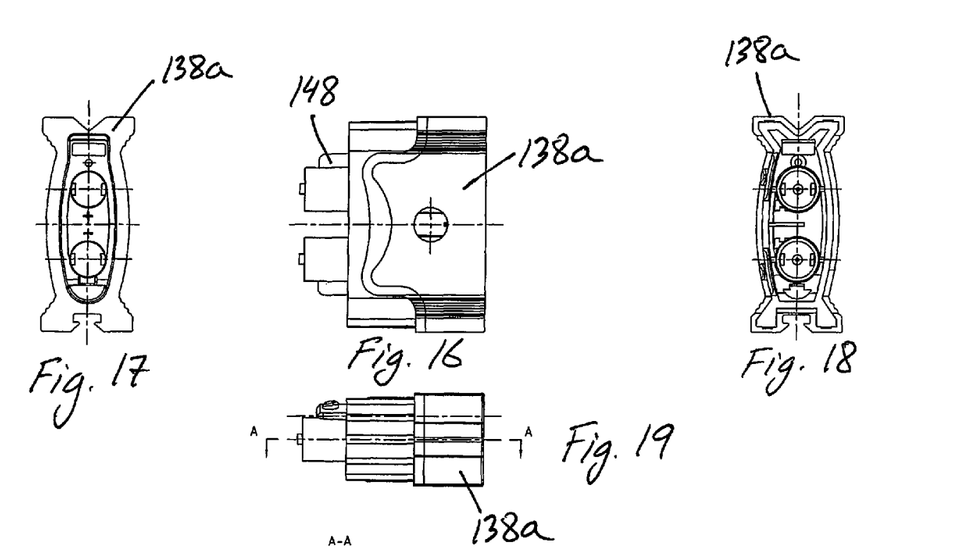
FIG. 16 is a side view of an end cap for housing a control circuit of the level shown in FIG. 1.
FIG. 17 is a front view of the end cap shown in FIG. 16.
FIG. 18 is a cross-sectional view of the end cap shown in FIG. 16.
FIG. 19 is a top view of the end cap shown in FIG. 16.
Figure 20:
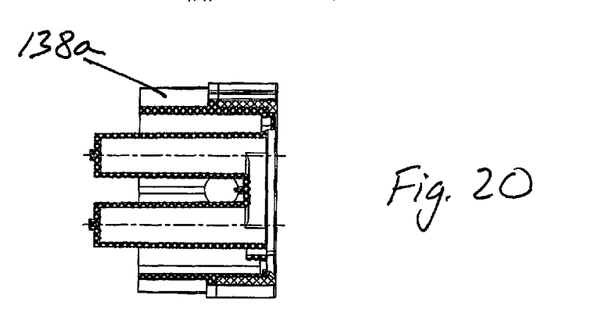
FIG. 20 is a cross-sectional view taken along line A-A of the end cap shown in FIG. 19.

In the present embodiment, the body 102 has a generally I-shaped cross-sectional shape. Specifically, the top wall 116 and the bottom wall 118 cooperate with the side walls 120, 122 to define, respectively, an upper pair of opposing flanges 128 and a lower pair of opposing flanges 130 that extend along the longitudinal length of the central portion of the body 102 and provide strength and stability to the level tool 100. It will be understood, however, that the cross-sectional profile of the body 102 can have any other suitable shape, for example, a generally rectangular cross-sectional shape. If desired, distance marking indicia can also be formed along the lower pair of opposing flanges 130, for example, in metric and English units, and with numerals to indicate the distance away from a starting indicia on each of the flanges 130.

The top and bottom walls 116, 118 cooperate with the side walls 120, 122 to define an outer surface of the body 102. The outer surface includes one or more portions defining one or more working surfaces, which contact a structure in a generally flush engagement when the level tool 100 is used to indicate the orientation of the structure. In the present embodiment, a pair of working surfaces 132,134 is defined by the outer surface of the top and bottom walls 116, 118, each working surface 132, 134 extending along a plane that is parallel to the center vial assembly 110b and perpendicular to the end vial assemblies 110a, 110c. In this way, the level 100 can indicate the orientation of a structure with respect to either the horizontal or vertical axes. Preferably, the working surfaces 132, 134 are milled or otherwise machined to provide, for example, improved accuracy and level contact with a structure.

As mentioned above, the level tool 100 includes three vial assemblies 110a, 110b, 110c for indicating the orientation of a structure. The center vial assembly 110b is arranged at least partially within the rectangular central vial opening 106b, and the end vial assemblies 110a, 110c are arranged at least partially within the circular end vial openings 106a, 106c of the body 102.

Referring now to FIGS. 1-4a, each vial assembly 110a, 110b, 110c includes an acrylic block vial 112a, 112b, 112c, i.e., a solid acrylic block having an internal cavity partially filled with liquid, a light source 114a, 114b, 114c for illuminating the block vial, and a plastic insert member 115a, 115b, 115c for receiving and securing the block vial and the light source. The insert member 115b of the center vial assembly 110b has a generally U-shaped cross-sectional shape and is mounted to the body 102 by means of a bracket 136, shown in FIGS. 9-13. The center block vial 112b is received within the internal cavity of the insert member 115b, shown in FIGS. 14-15. The insert member 115b of the center vial assembly 110b includes a protrusion 113 that defines an opening 111 in a side wall of the insert member for receiving and holding the light source 114b opposite an end of the block vial 112b for illuminating the block vial.

The insert members 115a, 115c of the end vial assemblies 110a, 110c have a generally rectangular cross-sectional profile and are fixed at predetermined locations within the body 102 relative to the end vial openings 106a, 106c, for example, by means of an adhesive. The insert members 115a, 115c, shown in FIGS. 5-8, define central openings for receiving the block vials 112a, 112c therein. Each insert member 115a, 115c also includes a projection 117a, 117c configured to securely receive and hold a light source 114a, 114c opposite an end of the block vial 112a, 112c being held therein for illuminating the block vial. In the present embodiment, the light sources 114a, 114b, 114c are light emitting diodes, but it is understood that any other type of light source suitable for illuminating the vials may be used. Further, it will be understood that other inserts, webs, plates, or rings that are suitably configured for receiving and securing the block vial and the light source without departing from the scope of the invention.

Referring now to FIGS. 2-4a and 16-20, the light sources 114a, 114c are powered by a control circuit 140 housed in the front end cap 138a of the level tool, as described hereinafter. In the present embodiment, the control circuit 140 includes a battery pack 142 and a switch 144 that is electrically connected to the battery pack 142 and the light sources 114a, 114b, 114c for selectively energizing the light sources. Preferably, the battery pack 142 comprises two (2) AAA cell batteries, although it can be designed to contain various numbers and sizes of batteries without departing from the scope of the invention. The switch 144 is a push button type switch mounted in a hole formed in a side wall of the end cap 138a so as to be externally accessible to a user. The control circuit 140 also includes an automatic shut-off circuit 146, for example an electronic timer, electrically connected to the battery pack 142 for turning off the light sources 114a, 114b, 114c after a predetermined amount of time following their activation. In other embodiments, the control circuit may include a different type of switch or other suitable electrical components that provide additional control over the degree of illumination.

The front end cap 138a includes a battery compartment 148 for holding the battery pack and a detachable battery cover 150 mounted thereon. The battery cover 150 includes at least one compliant latch 152 so that it can be pressed directly into a closed position and can be opened or removed to facilitate replacing the battery pack 142. The end cap 138a preferably is made of an elastomeric material for shock absorption, and thus protects against damage to the control circuit and helps to avoid accidental turn off of the light sources on impact.

Level tools are often used to determine the orientation of magnetic structures, such as pipes and support beams that are made of ferrous metals. Therefore, in one embodiment the level tool 100 may include one or more magnetic inserts for releasably securing the level tool to a ferrous component to be measured. For example, one or more magnetic inserts may be fixed within bores formed in the bottom wall 118 of the body 102. The magnetic inserts may be fixed within the bores via an interference fit or via an adhesive or other securing means. The magnetic inserts preferably have an effective strength so as to collectively support the weight of the level tool 100 when the level tool 100 engages a vertically oriented ferrous structure, while not significantly hindering removal of the level tool 100 from the ferrous structure when desired.

FIGS. 21-25 show another embodiment of a lighted level tool having one or more illuminated vials in accordance with the principles of the present invention. The lighted level tool 200 generally includes a body 202 having a generally solid cross-section throughout its overall length, except for openings, passageways, and indentations formed into or machined from the body 202. The body 202 preferably is made of an aluminum alloy, but any other suitable material may be used, such as other metal alloys and plastic or composite materials. One or more vial openings 210 are formed in the body 202, each of which contains a vial 212. The body 202 is configured to support the vials 212 directly within the vial openings 210, as described below.

Figure 22:
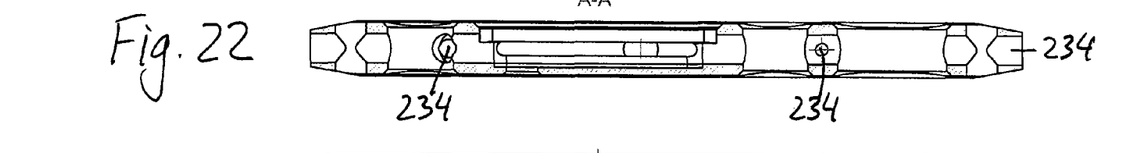
FIG. 22 is a cross-sectional view taken along line A-A of the level shown in FIG. 21.
Figure 23:
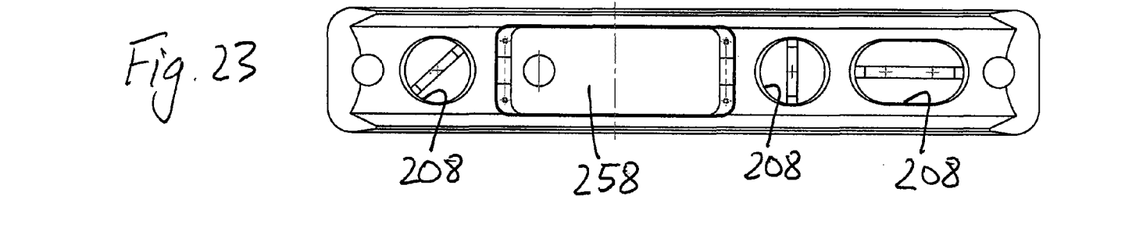
FIG. 23 is a cross-sectional view taken along line B-B of the level shown in FIG. 21.
Figure 24:
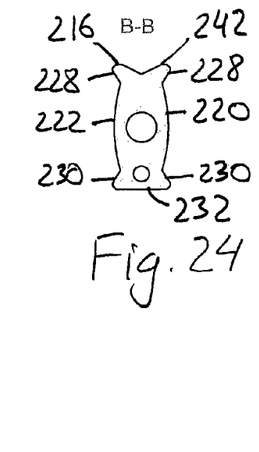
FIG. 24 is a right side view of the level shown in FIG. 21.

The body 202 includes a pair of top and bottom walls 216, 218 extending between a pair of oppositely facing ends 224, 226 and a pair of oppositely facing side walls 220, 222 connected between the top and bottom walls 216, 218. The top wall 216 includes a V-shaped groove 242 that extends along its longitudinal length to facilitate placement on a pipe or a conduit. In the present embodiment, the body 202 has a generally I-shaped cross-sectional shape. Specifically, the top wall 216 and the bottom wall 218 cooperate with the side walls 220, 222 to define, respectively, an upper pair of opposing flanges 228 and a lower pair of opposing flanges 230 that extend along the longitudinal length of the central portion of the body 202. It will be understood, however, that the cross-sectional profile of the body 202 can have any other suitable shape, for example, a generally rectangular cross-sectional shape.

The top and bottom walls 216, 218 cooperate with the side walls 220, 222 to define an outer surface 204 of the body 202. The outer surface 204 also includes one or more portions defining one or more working surfaces 232, which contact a structure in a generally flush engagement when the level tool 200 is used to indicate the orientation of the structure. In the present embodiment, a working surface 232 is defined by the outer surface of the bottom wall 218. Additionally, the top and bottom walls 216, 218 preferably are parallel with each other such that the outermost surface of the top wall 216 defines a second working surface. Preferably, the working surfaces 232 are milled or otherwise machined to provide, for example, improved accuracy and level contact with a structure.

Figure 21:
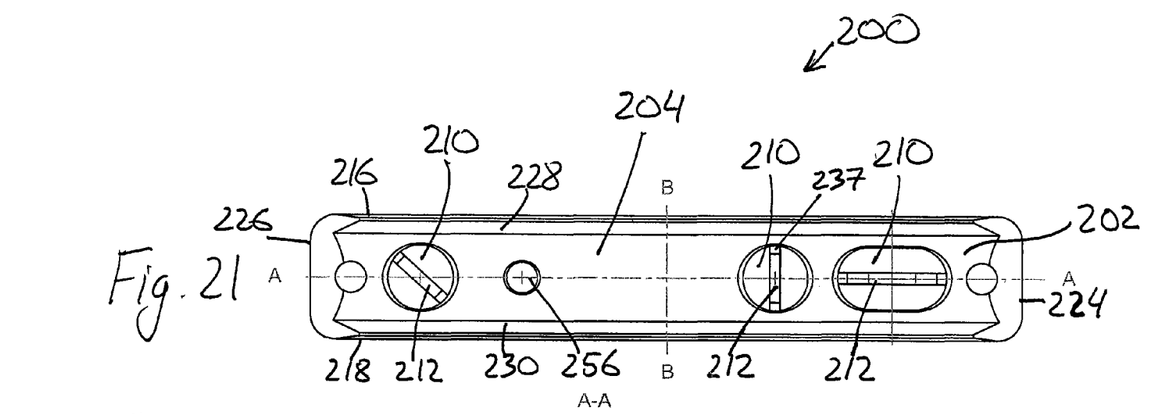
FIG. 21 is a left side view of a second embodiment of a level embodying the principles of the present invention.
Figure 25:
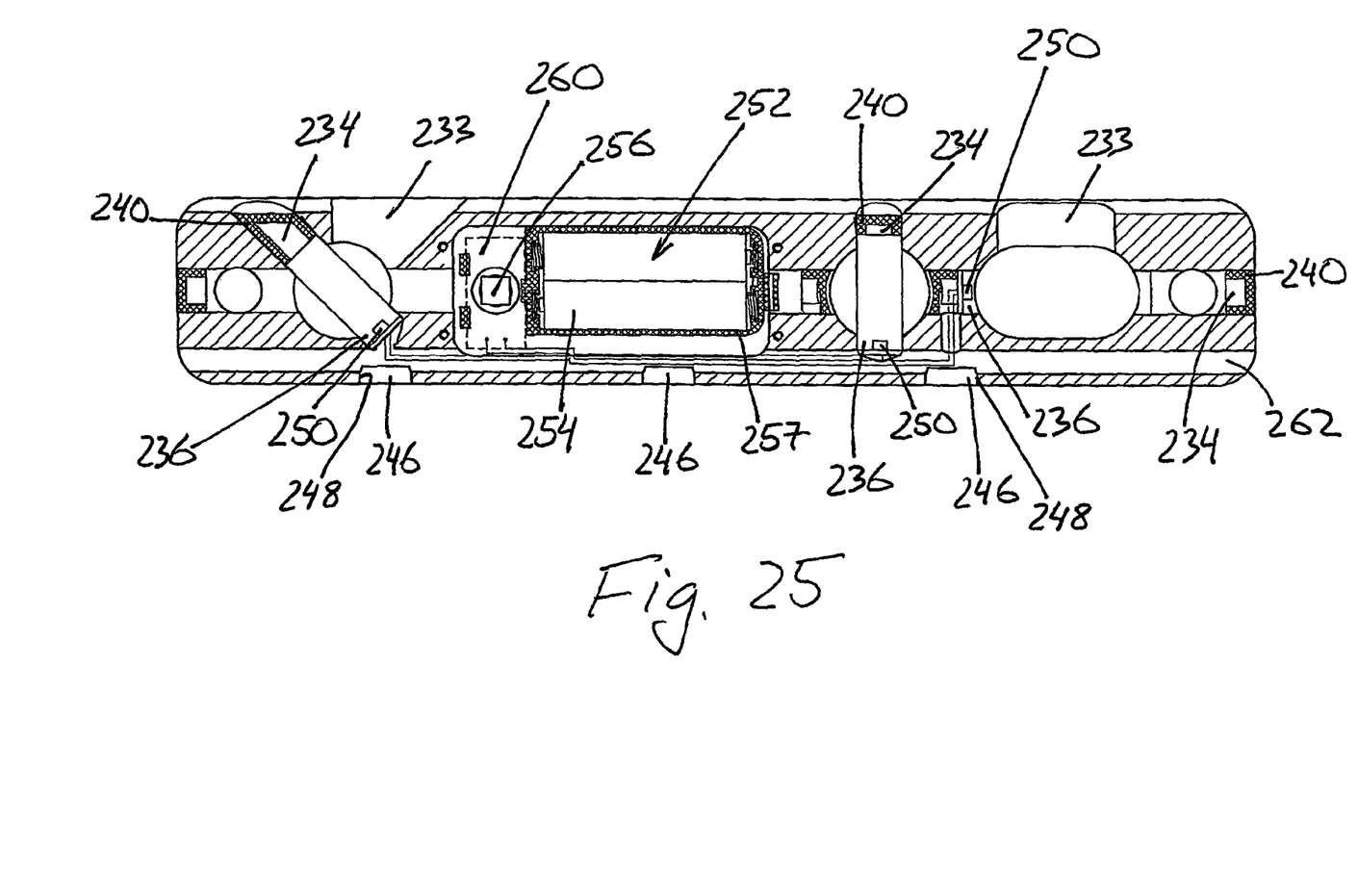
FIG. 25 is a cross-sectional view of the level shown in FIG. 21.

As mentioned above, the body 202 of the level tool 200 defines a plurality of vial openings 210 that receive the vials 212 therein. Each of the vial openings 210 extends completely through the body 202 between the side walls 220, 222 to allow a user to view the vials 212. In the present embodiment, the level tool 200 includes three vial openings 210 that are spaced along the longitudinal length of the body 202. Two of the vial openings 210 support a pair of vials 212 that are respectively mounted parallel and perpendicular to the working surfaces 232 so that the level 200 can indicate the orientation of a structure with respect to either the horizontal axis or the vertical axis. The other vial opening 210 supports a vial 212 that is mounted at a forty-five degree angle relative to the working surfaces 232.

As mentioned above, the vials 212 are directly supported by the body 202 of the tool 200 in the vial openings 210 rather than being supported by inserts or other separate components that are disposed in the vial openings 210. This configuration creates a more secure and a less complex connection between the body 202 and the vials 212, thereby potentially improving the durability of the level tool 200 and reducing manufacturing costs.

A plurality of passageways 234 are formed in the body 202 such that at least one passageway 234 intersects each of the vial openings 210 and is axially aligned with the vial 212 positioned within the respective vial opening 210. The passageways 234 each have a diameter and shape corresponding to the diameter and shape of the vials 212 such that the vials 212 are able to be inserted into the vial openings 210 via the passageways 234. The vials 212 each have a length sufficiently longer than the diameter of the vial openings 210 such that a first end 237 of each vial extends into one of the passageways 234 and is supported therein once the vials 212 are inserted across the vial openings 210.

In addition, because the level tool 200 has a substantially solid body 202, each vial opening 210 defines a bore surface 208. Each bore surface 208 has a recess 236 formed therein directly opposite the respective passageway 234 that intersects the vial opening 210. In this way, each recess 236 is in alignment with a respective vial 212 and a respective passageway 234 for receiving and supporting a light source, as described hereinafter. Preferably, the recesses 236 each have a diameter and shape corresponding to the diameter and shape of the vials 212. In this way, the vials 212 may rest within the vial openings 210 once the vials 212 are inserted into the vial openings 210 if so desired.

The body 202 also includes a plurality of viewing windows 233 formed in the top and/or bottom walls 216 and 218 and intersecting one or more of the respective vial openings 210. In this way, for example, when the working surface 232 defined by the outer surface of the bottom wall 218 engages a structure, a user can view one or more of the vials 212 while facing the top wall 216 through the viewing windows 233 formed in the top wall 216.

The level tool 200 also includes three light sources 250 arranged opposite one of the ends of the vials for illuminating the vials. In particular, each light source is mounted in the recess 236 in the bore surface 208 of a vial opening 210. In the present embodiment, the light sources 250 are powered by a control circuit 252 including a battery pack 254 and a switch 256 that is electrically connected to the battery pack 254 and the light sources 250 for selectively energizing the light sources. Preferably, the battery pack 254 comprises two (2) AAA cell batteries, although it can be designed to contain various numbers and sizes of batteries without departing from the scope of the invention. A battery compartment 257 for holding the battery pack is secured in a cavity formed in the right side wall 220 of the body 202. The battery compartment 257 can be made of any durable material, but preferably is constructed of plastic. A detachable battery cover 258 is mounted on the battery compartment 257. For example, the battery cover 258 can be press-fit directly into place or slid into a closed position. More specifically, the battery cover 226 may include a pair of compliant latches so that it can be pressed directly into a closed position and can be opened or removed to facilitate replacing the battery pack 254.

The switch 256 is a push button type switch mounted in a hole formed in the left side wall 222 so as to be externally accessible to a user. The switch 256 is electrically connected to the battery pack and the light sources using wires that are guided at least partially through a bore 262 that extends along the longitudinal length of the body 202.

The control circuit 252 also includes an automatic shut-off circuit 260, for example an electronic timer, electrically connected to the battery pack 254 for turning off the light sources 250 after a predetermined time interval following activation. In other embodiments, the control circuit 252 may include a different type of switch or other suitable electrical components that provide additional control over the degree of illumination.

The level tool 200 also includes a plurality of plugs 240 for further securing the vials 212 within the vial openings 210.

The plugs 240 are each positioned within one of the passageways 234 to prevent the vials 212 from undesirably migrating through the passageways 234 during use of the level tool 200. Preferably, the plugs 240 are each configured to form an interference fit with the passageways 234, but the plugs 240 may additionally or alternatively be secured to the body 202 via an adhesive or other fastening means. The plugs 240 preferably are each made of an organic polymer, rather than glue, wax, or silicone. For example, the plugs 240 preferably are made of one of the following materials: polyethylene (PE), polypropylene (PP), or polyvinyl chloride (PVC).

As shown in FIG. 25, the level tool 200 may also include a plurality of magnetic inserts 246 supported by the body 202 for releasably securing the level tool to a ferrous component to be measured. For example, the magnetic inserts 246 are each positioned within a bore 248 formed in the bottom wall 218. The magnetic inserts 246 may be secured within the bores 248 via an interference fit or via an adhesive or other securing means. The magnetic inserts 246 are preferably of a type and size suitable for temporarily securing the level tool 200 to a ferrous component to be measured via a magnetic attractive force. More specifically, the magnetic inserts 246 preferably each have an effective strength such that the magnetic inserts are able to collectively support the weight of the level tool 200 when the level tool 200 engages a vertically oriented ferrous structure, while not significantly hindering removal of the level tool 200 from the ferrous structure when desired.

In addition, at least one of the bores 248 may be formed in the bottom wall 218 as to allow access from outside the body 202 to one or more light sources 250 when the magnetic inserts 246 are not secured within the bores 248. For example, in the present embodiment, the leftmost bore 246, as shown in FIG. 25, is formed at a location along the bottom wall that is generally vertically aligned with the light source 250 mounted in the recess 236 of the leftmost vial opening 210 and intersects the longitudinal bore 262 and extends to the leftmost recess 236. Also, the rightmost bore 246 is formed at a location along the bottom wall that is generally vertically aligned with the light source 250 mounted in the recess 236 of the rightmost vial opening 210 and intersects the longitudinal bore 262 and extends to the rightmost recess 236. Other openings may also be formed in the body 202 to provide access from each of these bores 246 to the corresponding light sources 250.

While the present invention has been described in terms of preferred embodiments, it will be understood, of course, that the invention is not limited thereto since modifications may be made to those skilled in the art, particularly in light of the foregoing teachings.

What is claimed is:

1. A level tool comprising:
    a body including at least one vial opening;
    a vial disposed at least partially within the at least one vial opening;
    a light source for illuminating the vial; and
    an insert member mounted at a predetermined location in the body relative to the at least one vial opening, the insert member having a unitary, one-piece construction configured to receive the vial therein and to hold the light source opposite an end of the vial,
    wherein the insert member includes a light source mount extending in a direction generally perpendicular to a wall of the insert member for holding the light source opposite an end of the vial.

2. The level tool of claim 1, wherein the insert member has a generally U-shaped cross-sectional shape that defines an internal cavity for receiving the vial, and wherein the light source mount forms a protrusion that defines an opening in a side wall of the insert member for holding the light source opposite the end of the vial.

3. The level tool of claim 2 further comprising a generally U-shaped bracket configured to mount the insert member to the body at least partially within a rectangular vial opening.

4. The level tool of claim 1, wherein the insert member defines a central opening in a face of the insert member for receiving the vial therein, and wherein the light source mount forms a projection extending in a direction generally perpendicular to the face of the insert member for holding the light source opposite the end of the vial.

5. The level tool of claim 1 further comprising at least one end cap mounted at an end of the body and a control circuit for powering the light source housed in the at least one end cap, wherein the end cap is made of an elastomeric material.

6. The level tool of claim 5, wherein the control circuit includes a battery pack and a switch electrically connected to the battery pack for selectively energizing the light source.

7. The level tool of claim 6, wherein the control circuit includes an automatic shut-off circuit electrically connected to the battery pack for turning off the light source.

8. The level tool of claim 6, wherein the end cap includes a battery compartment for holding the battery pack and a detachable battery cover mounted on the end cap for accessing the battery pack.

* * * * *